US011949573B2

(12) United States Patent
Castinado et al.

(10) Patent No.: US 11,949,573 B2
(45) Date of Patent: Apr. 2, 2024

(54) SYSTEM AND METHOD FOR PARALLEL TESTING OF MULTIPLE DATA PROCESSING CHANNELS FOR DATA PROCESSING OPTIMIZATION

(71) Applicant: BANK OF AMERICA CORPORATION, Charlotte, NC (US)

(72) Inventors: Joseph Benjamin Castinado, North Glenn, CO (US); Naoll Addisu Merdassa, Chakopee, MN (US); Adam Frederick Perrigo, Maiden, NC (US); Lee Ann Proud, St. Augustine, FL (US); Kevin Graham Robberts, Charlotte, NC (US); Christopher J. Smith, Johns Creek, GA (US); Ann Ta, Scottsdale, AZ (US); Kathleen Hanko Trombley, Oakboro, NC (US); Therese Humburg Willis, Apopka, FL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 196 days.

(21) Appl. No.: 17/553,446

(22) Filed: Dec. 16, 2021

(65) Prior Publication Data
US 2023/0198871 A1 Jun. 22, 2023

(51) Int. Cl.
H04L 43/067 (2022.01)
H04L 43/00 (2022.01)
H04L 43/0829 (2022.01)
H04L 43/50 (2022.01)
H04W 24/10 (2009.01)

(52) U.S. Cl.
CPC ........ *H04L 43/067* (2013.01); *H04L 43/0829* (2013.01); *H04L 43/14* (2013.01); *H04L 43/50* (2013.01); *H04W 24/10* (2013.01)

(58) Field of Classification Search
CPC ... H04L 43/067; H04L 43/0829; H04L 43/14; H04L 43/50; H04W 24/10
USPC ........................................ 709/224
See application file for complete search history.

(56) References Cited

U.S. PATENT DOCUMENTS

| 7,840,178 | B2 | 11/2010 | Hellman |
| 7,865,917 | B2 | 1/2011 | Hellman |
| 7,930,716 | B2 | 4/2011 | Liga et al. |
| 8,024,269 | B1* | 9/2011 | Ballard ............... H04L 63/0428 705/40 |
| 8,270,901 | B2 | 9/2012 | Hellman |
| 8,438,646 | B2 | 5/2013 | Sidi |
| 8,499,244 | B2 | 7/2013 | Simon et al. |
| 8,555,306 | B2 | 10/2013 | Zmuda et al. |
| 8,601,461 | B2 | 12/2013 | Vrijsen |

(Continued)

*Primary Examiner* — Hermon Asres
(74) *Attorney, Agent, or Firm* — Moore & Van Allen PLLC; Nicholas C. Russell

(57) ABSTRACT

Systems, computer program products, and methods are described herein for the parallel testing of multiple data processing channels. The present invention may be configured to generate a data packet, send the data packet to a processing channel for processing at a send time, receive the processed data from the processing channel at a return time, determine the percent accuracy for the processed data from the processing channel, and record the send time, return time, and percent accuracy in an analytics system. The present invention may also be configured to determine the security of the processing channel and record the security in the analytics system.

17 Claims, 3 Drawing Sheets

(56) References Cited

U.S. PATENT DOCUMENTS

| | | | |
|---|---|---|---|
| 8,627,354 B2 | 1/2014 | Hellman | |
| 8,732,764 B2 | 5/2014 | Kummer et al. | |
| 8,776,108 B2 | 7/2014 | Barsook et al. | |
| 9,191,450 B2 | 11/2015 | Sidi et al. | |
| 2006/0031892 A1 | 2/2006 | Cohen | |
| 2006/0222321 A1 | 10/2006 | Russ | |
| 2007/0107022 A1 | 5/2007 | Lawrence | |
| 2007/0248314 A1 | 10/2007 | Iggulden | |
| 2008/0040742 A1 | 2/2008 | Howcroft et al. | |
| 2008/0127247 A1 | 5/2008 | Allen et al. | |
| 2010/0094953 A1 | 4/2010 | Kwon et al. | |
| 2011/0082744 A1 | 4/2011 | Iida et al. | |
| 2012/0239590 A1* | 9/2012 | Broder | G06Q 30/0251 705/346 |
| 2022/0327038 A1* | 10/2022 | Shore | G06F 11/0793 |

* cited by examiner

SYSTEM AND METHOD FOR PARALLEL TESTING OF MULTIPLE DATA PROCESSING CHANNELS FOR DATA PROCESSING OPTIMIZATION

FIELD OF THE INVENTION

The present invention embraces an electronic system for analyzing multiple data processing channels to optimize data processing.

BACKGROUND

Networks vary depending on location, time, data load, and many other factors. A user may not always know which network is best for their particular use. A network user may wish to evaluate multiple data processing channels in an effort to optimize data processing and determine which channel to use in a particular instance.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for parallel testing of multiple data processing channels is presented. The system may include at least one non-transitory storage device and at least one processing device coupled to the at least one non-transitory storage device, where the at least one processing device may be configured to: generate a data packet, send the data packet to a first data processing channel for processing at a first send time, and send the data packet to a second data processing channel for processing at a second send time. The at least one processing device may be further configured to receive first processed data from the first data processing channel at a first return time and receive second processed data from the second data processing channel at a second return time. The at least one processing device may be further configured to determine the percent accuracy for the first data processed data and for the second processed data. The at least one processing device may be further configured to record: the first send time, the second send time, the first return time, the second return time, the first percent accuracy, and the second percent accuracy in an analytics system.

In another aspect, a computer program product for parallel testing of multiple data processing channels is presented. The computer program product may include a non-transitory computer-readable medium including code causing a first apparatus to: generate a data packet, send the data packet to a first data processing channel for processing at a first send time, and send the data packet to a second data processing channel for processing at a second send time. The non-transitory computer-readable medium may further comprise code causing the first apparatus to receive first processed data from the first data processing channel at a first return time and receive second processed data from the second data processing channel at a second return time. The non-transitory computer-readable medium may further comprise code causing the first apparatus to determine the percent accuracy for the first data processed data and for the second processed data. The non-transitory computer-readable medium may further comprise code causing the first apparatus to record: the first send time, the second send time, the first return time, the second return time, the first percent accuracy, and the second percent accuracy in an analytics system.

In yet another aspect, a method for parallel testing of multiple data processing channels is provided. The method may include: generating a data packet, sending the data packet to a first data processing channel for processing at a first send time, and sending the data packet to a second data processing channel for processing at a second send time. The method may further comprise receiving first processed data from the first data processing channel at a first return time and receiving second processed data from the second data processing channel at a second return time. The method may further include determining the percent accuracy for the first data processed data and for the second processed data. The method may further include recording the first send time, the second send time, the first return time, the second return time, the first percent accuracy, and the second percent accuracy in an analytics system.

In some embodiments, the present invention includes determining a measure of security for each of the first data processing channel and the second data processing channel and recording the measure of security in the analytics system. In some embodiments, the data packets are sent from a specified location, and the specified location is recorded in the analytics system. Additionally, or alternatively, the first data processing channel and the second data processing channel are each selected from the group comprising a 4G network, a 5G network, a broadband network, and a dial-up network. In some embodiments, the data packet comprises information relating to a resource transfer. Additionally, or alternatively, the data packet is encrypted.

BRIEF DESCRIPTION OF THE DRAWINGS

Figure 1:
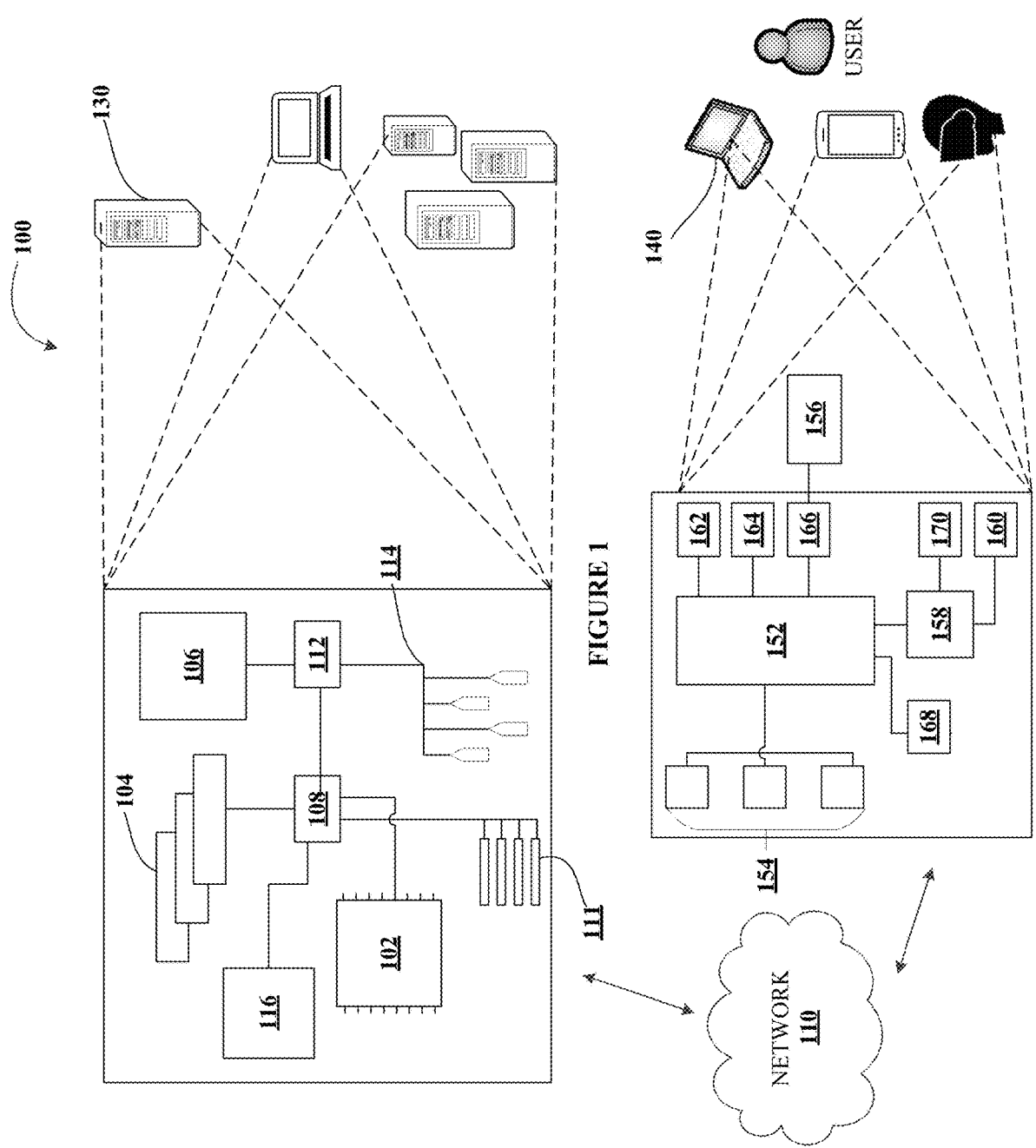
Figure 2:
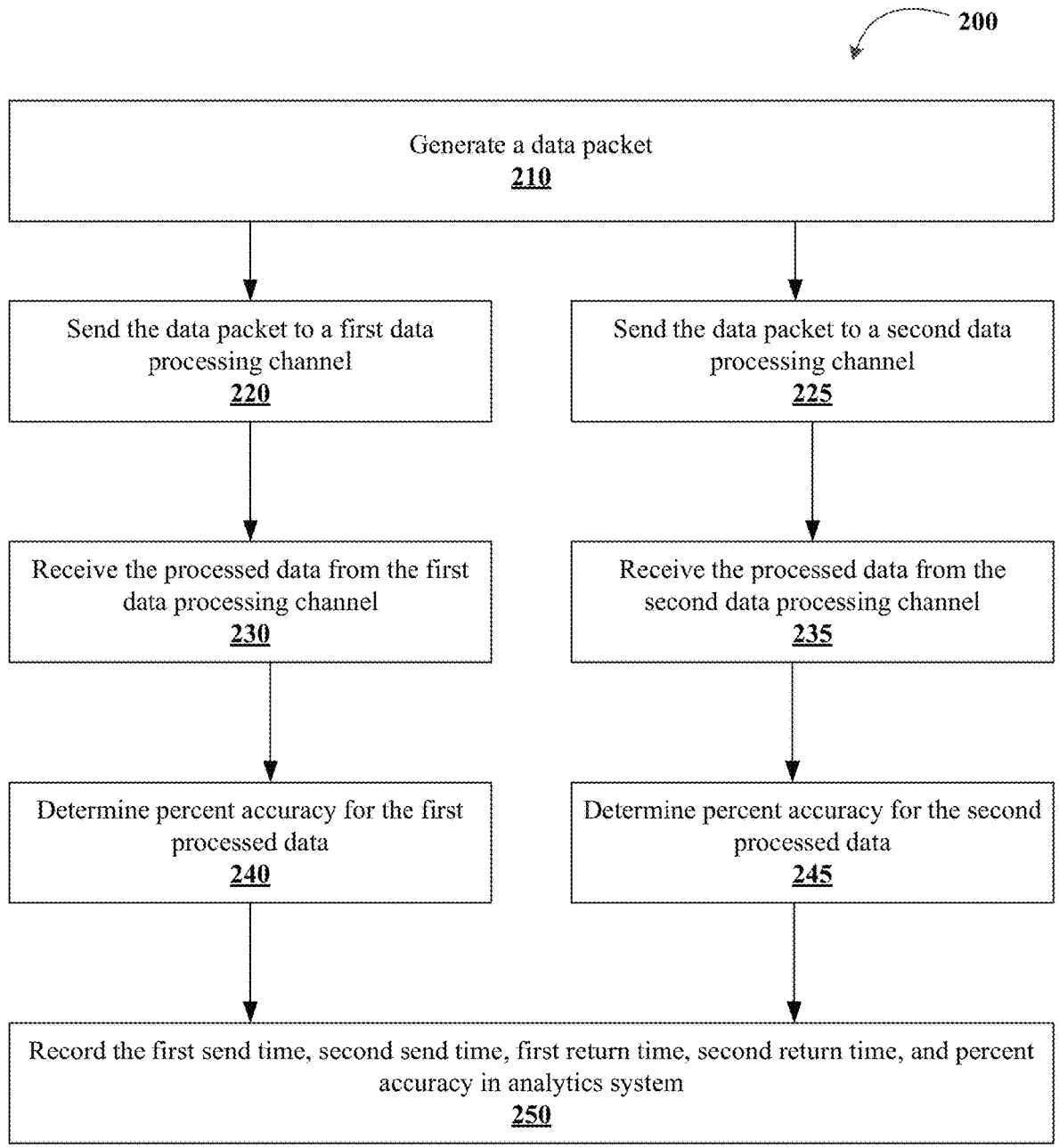
Figure 3:
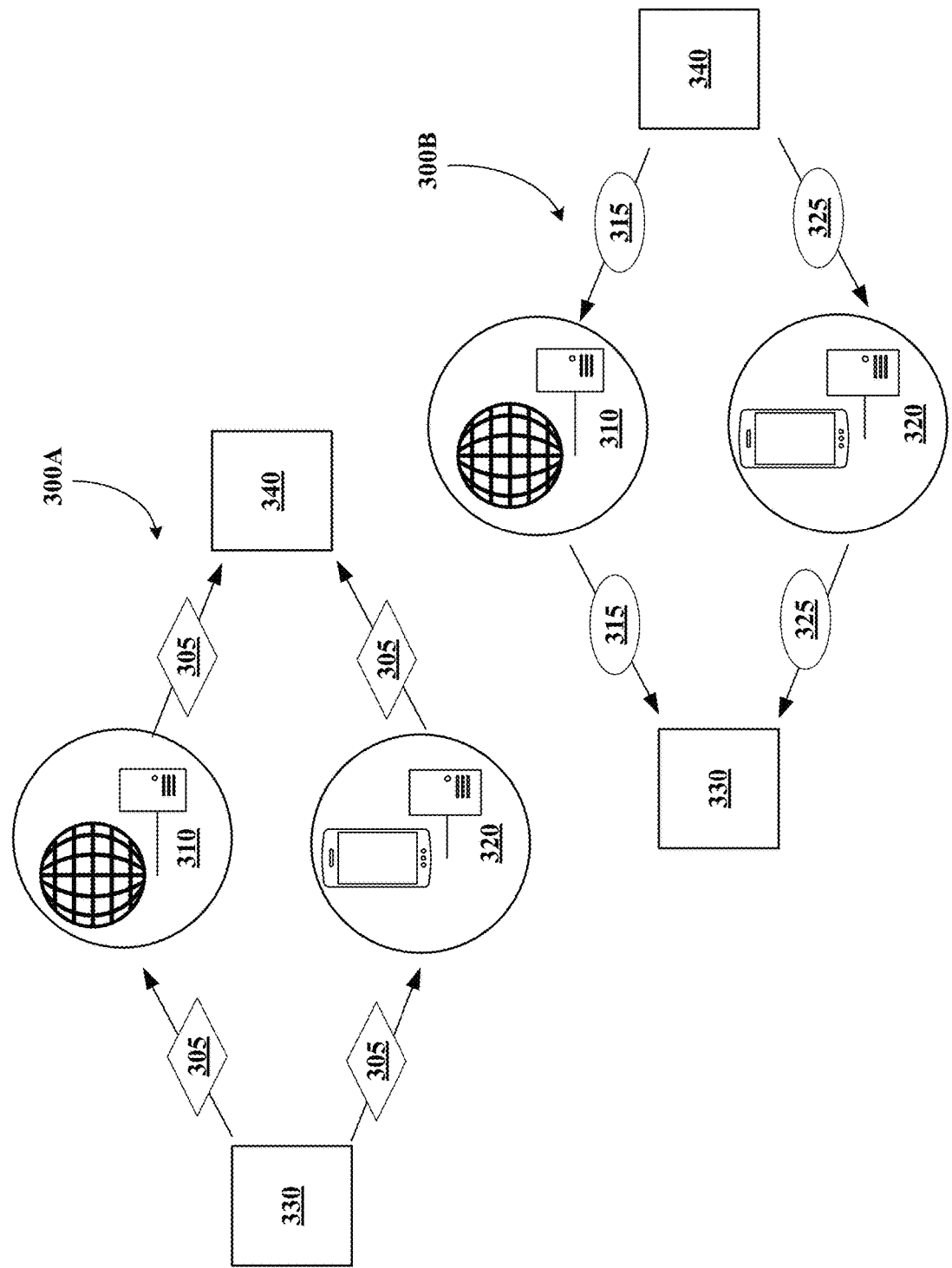

Having thus described embodiments of the invention in general terms, reference will now be made the accompanying drawings, wherein:

FIG. 1 illustrates technical components of a system for parallel testing of multiple data processing channels, in accordance with an embodiment of the invention;

FIG. 2 illustrates a process flow for parallel testing of multiple data processing channels, in accordance with an embodiment of the invention; and FIG. 3 illustrates an exemplary schematic for parallel testing of multiple data processing channels, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, the system may be configured to test multiple channels of data processing in an effort to determine which channel suits the user's needs at a particular instance. The present invention is a system, method, and computer program product for tracking data provider quality. The system may test multiple channels to determine or measure the quality of each channel. Quality, for the purposes of this disclosure, consists of various aspects including speed, accuracy, and security. The system described herein, may perform parallel tests of multiple processing channels to measure the quality of data transmission at various times and conditions. As an example, this process may be useful for determining through which network to send a resource transfer. Electronic resource transfers require speed, accuracy, and security. During an electronic resource transfer, information such as cardholder name, cardholder address, card number, card expiration, and other information may be transmitted through the processing channel. This information is processed on the other end and returned via the processing channel as processed data.

The present invention may send a data packet or information through multiple processing channels to determine the quality of the transmission for each channel. In this way the system may determine which channel is best suited for a particular scenario. For example, one channel may have better quality at a particular time of day. As another example, one channel may have better quality during a particular weather pattern. By keeping note of this information and recording the information in an analytics system a user may be able to determine which processing channel to use to best suit their needs.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or the like employing information technology resources for processing large amounts of data. In some embodiments, the entity may be an institution, group, association, financial institution, establishment, company, union, authority, merchant, service provider, and/or the like hosting, sponsoring, coordinating, creating, and/or the like events, recognitions, achievements, and/or the like.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein. In some embodiments, a user may be a verified authority as described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes; and/or the like); sending remittances; loading money onto stored value cards (SVCs) and/or pre-paid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As used herein, identifiers such as "first," "second," "third," and/or the like do not indicate a temporal relationship, unless explicitly stated. Such identifiers may modify instances of similar things and may be used to differentiate between each of the instances.

As used herein, a "subset" may refer to one or more from a group. For example, a subset of users from a group of users may be one user from the group of users, multiple users from the group of users, or all of the users from the group of users. As another example, a subset of properties may be one property from the properties, multiple properties from the properties, or all of the properties.

FIG. 1 presents an exemplary block diagram of a system environment 100 for parallel testing of multiple data processing channels, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for parallel testing of multiple data processing channels, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or data storage systems and/or one or more data receiving systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate generation of a data packet for parallel testing of multiple data processing channels, and/or the like using one or more systems, applications, services, and/or the like (e.g., similar to the system 130, running a system similar to the system 130, and/or the like) and the user input system may provide information (time, processed data, etc) to a data storage system or data receiving system (e.g., similar to the system 130, running a system similar to the system 130, and/or the like). In some embodiments, system or program may perform one or more of the steps described herein with respect to the process flows described herein with respect to FIG. 2.

FIG. 2 illustrates a process flow 200 for parallel testing of multiple processing channels, in accordance with an embodiment of the invention. In some embodiments, the parallel testing system and/or the like (e.g. similar to one or more of the systems described herein with respect to FIG. 1) may perform one or more of the steps of process flow 200.

As shown in block 210, the process flow 200 may include generating a data packet. In one example, the data packet may contain information related to a resource transfer. The data packet may contain fake data that the system knows is fake, in this way the system knows that this is data sent for testing the multiple data processing channels.

As shown in block 220, the process flow 200 may include sending the data packet to a first data processing channel. As show in block 225, the process flow may also include sending the data packet to a second data processing channel. In some embodiments, the data packets are sent to the first and second data processing channels at the same time.

Additionally, or alternatively, the data packets are sent to the first and second data processing channels at different times.

As shown in block 230, the process flow 200 may include receiving processed data from the first data processing channel. As shown in block 235, the process flow 200 may include receiving processed data from the second data processing channel. The system may note the time that the processed data was received from each data processing channel.

As shown in block 240, the process flow 200 may include determining percent accuracy for the processed data received from the first data processing channel. As shown in block 245, the process flow 200 may include determining percent accuracy for the processed data received from the second data processing channel. The percent accuracy is determined by comparing the expected results for the data packet to the processed data received from each data processing channel.

As shown in block 250, the process flow 200 may include recording the first send time, the second send time, the first return time, the second return time, and the percent accuracy for each of the data processing channels in an analytics system. In this way, the data is recorded for future decision making regarding which data processing channel to use as well as further calculation of the quality of each data processing channel.

Process flow 200 may include additional embodiments, such as any single embodiment or any combination of embodiments described below and/or in connection with one or more other processes described elsewhere herein.

In a first embodiment, the process flow 200 may further include the step of determining a measure of security for each of the first data processing channel and the second data processing channel. Additionally, or alternatively, the process flow may further include recording the measure of security in the analytics system. Determining a measure of security may include determining whether there is a firewall, determining whether or not the data was modified, determining whether or not the data remains confidential, and/or determining whether any information or data was lost throughout transmission.

In a second embodiment alone or in combination with the first embodiment, the data packet is sent from a specified location and the specified location is recorded in the analytics system. Each of the data processing channels may have different qualities depending on the location, therefore it may be important to note the location from which each data packet is sent to determine the quality of each data processing channel at various locations.

In a third embodiment alone or in combination with any of the first through second embodiments, the first data processing channel may be a 4G network, a 5G network, a broadband network, or a dial-up network. In some embodiments, the second data processing channel may be a 4G network, a 5G network, a broadband network, or a dial-up network.

In a fourth embodiment alone or in combination with any of the first through third embodiments, the data packet contains information relating to a resource transfer.

In a fifth embodiment alone or in combination with any of the first through fourth embodiments, the data packet contains a resource amount.

In a sixth embodiment alone or in combination with any of the first through fifth embodiments, the data packet contains a cardholder name.

In a seventh embodiment alone or in combination with any one of the first through sixth embodiments, the data packet contains a cardholder address. In some embodiments, the cardholder address includes a street number, street name, city, state, and zip-code. Additionally, or alternatively, the cardholder address includes only a zip-code.

In an eight embodiment alone or in combination with any one of the first through seventh embodiments, the data packet contains a card number. In some embodiments, the card number is the number represented on an entity-issued card. Additionally, or alternatively, the card number is a virtual card number.

In a ninth embodiment alone or in combination with any one of the first through eighth embodiments, the data packet contains a card expiration date.

In a tenth embodiment alone or in combination with any one of the first through ninth embodiments, the data packet contains a resource transfer identification.

In an eleventh embodiment alone or in combination with any one of the first through tenth embodiments, the data packet contains a beneficiary identification. In some embodiments, the beneficiary identification serves to identify who the resource may be paid to.

In a twelfth embodiment alone or in combination with any one of the first through eleventh embodiments, the data packet contains a beneficiary account identification. In some embodiments, the beneficiary account identification serves to identify where the resource is to be sent.

In a thirteenth embodiment alone or in combination with any one of the first through fourteenth embodiments, the data packet may contain sensitive information. In some embodiments, the sensitive information contains test results. Additionally, or alternatively, the sensitive information contains insurance information. In some embodiments, the sensitive information contains personal information. Additionally, or alternatively, the sensitive information contains business information.

In a fourteenth embodiment alone or in combination with any one of the first through thirteenth embodiments, the data packet is encrypted.

In a sixteenth embodiment alone or in combination with any one of the first through fourteenth embodiments, the analytics system assigns each data processing channel a score. In some embodiments, the score is a measure of quality of each data processing channel at a specified location. Additionally, or alternatively, the score is a measure of quality of each data processing channel at a group of locations.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 5 illustrates an exemplary schematic for parallel testing of multiple data processing channels, in accordance with an embodiment of the invention. The system first sends the data packet, as represented in 300A. A data packet 305 is sent from a specified location 330 via a first data processing channel 310. Additionally, a data packet 305 is sent from a specified location 330 via a second data processing channel 320. The first data processing channel sends the data packet 305 to a third party 340. The second data processing channel sends the data packet 305 to a third party 340. The system then receives the processed data, as represented in 300B. The processed data 315 is sent from the third party 340 via the first data processing channel 310. The processed data 325 is sent from the third party 340 via the second data processing channel 320. The specified location 330 receives the processed data 315 via the first data processing channel 310. The specified location 330 receives the processed data 325 via the second data processing channel 320. In some embodiments, the system will evaluate the processed data 315 and the processed data 325 to determine accuracy and record the accuracy on the analytics system.

In some embodiments, the system may perform parallel testing of two data processing channels as represented in FIG. 3. Additionally, or alternatively, the system may perform parallel testing of more than two data processing channels. For example, the system may perform parallel testing of three data processing centers. In another example, the system may perform parallel testing of four data processing systems. In some embodiments, the system may perform parallel testing of multiple data processing channels in tandem, or at the same time. In other embodiments, the system may perform parallel testing of multiple data processing channels sequentially, or at different times.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for parallel testing of multiple data processing channels, the system comprising
    at least one non-transitory storage device, and
    at least one processing device coupled to the at least one non-transitory storage device, wherein the at least one processing device is configured to:
        generate a data packet comprising data related to a resource transfer and known fake data,
        send the data packet to a first data processing channel for processing at a first send time,
        send the data packet to a second data processing channel for processing at a second send time,
        receive first processed data from the first data processing channel at a first return time,
        receive second processed data from the second data processing channel at a second return time,
        determine percent accuracy for the first processed data,
        determine percent accuracy for the second processed data,
        determine a measure of security for each of the first data processing channel and the second data processing channel and record the measure of security in an analytics system, wherein determining the measure of security further comprises determining a firewall status, determining if processed data was modified, and determining data loss throughout transmission, and
        record the first send time, the second send time, the first return time, the second return time, the percent accuracy for the first processed data, and the percent accuracy for the second processed data in an analytics system.

2. The system for parallel testing of multiple data processing channels according to claim 1, wherein the at least one processing device is further configured to:
    determine a measure of security for each of the first data processing channel and the second data processing channel, and
    record the measure of security in the analytics system.

3. The system for parallel testing of multiple data processing channels according to claim 1, wherein the data packet is sent from a specified location, and the specified location is recorded in the analytics system.

4. The system for parallel testing of multiple data processing channels according to claim 1, wherein the first data processing channel and the second data processing channel are each selected from the group comprising a 4G network, a 5G network, a broadband network, and a dial-up network.

5. The system for parallel testing of multiple data processing channels according to claim 1, wherein the data packet comprises at least one of a resource amount, a cardholder name, a cardholder address, a card number, and a card expiration date.

6. The system for parallel testing of multiple data processing channels according to claim 1, wherein the data packet is encrypted.

7. A computer program product for parallel testing of multiple data processing channels, the computer program product comprising a non-transitory computer-readable medium comprising code causing a first apparatus to:
    generate a data packet comprising data related to a resource transfer and known fake data,
    send the data packet to a first data processing channel for processing at a first send time,
    send the data packet to a second data processing channel for processing at a second send time,
    receive first processed data from the first data processing channel at a first return time,
    receive second processed data from the second data processing channel at a second return time,
    determine percent accuracy for the first processed data,
    determine percent accuracy for the second processed data,
    determine a measure of security for each of the first data processing channel and the second data processing channel and record the measure of security in an analytics system, wherein determining the measure of security further comprises determining a firewall status, determining if processed data was modified, and determining data loss throughout transmission, and
    record the first send time, the second send time, the first return time, the second return time, the percent accuracy for the first processed data, and the percent accuracy for the second processed data in an analytics system.

8. The computer program product for parallel testing of multiple data processing channels according to claim 7, wherein the non-transitory computer-readable medium comprises code causing the first apparatus to:
    determine a measure of security for each of the first data processing channel and the second data processing channel, and
    record the measure of security in the analytics system.

9. The computer program product for parallel testing of multiple data processing channels according to claim 7, wherein the data packet is sent from a specified location, and the specified location is recorded in the analytics system.

10. The computer program product for parallel testing of multiple data processing channels according to claim 7, wherein the first data processing channel and the second data processing channel are each selected from the group comprising a 4G network, a 5G network, a broadband network, and a dial-up network.

11. The computer program product for parallel testing of multiple data processing channels according to claim 7, wherein the data packet comprises at least one of a resource amount, a cardholder name, a cardholder address, a card number, and a card expiration date.

12. The computer program product for parallel testing of multiple data processing channels according to claim 7, wherein the data packet is encrypted.

13. A method for parallel testing of multiple data processing channels, the method comprising:
    generating a data packet comprising data related to a resource transfer and known fake data,
    sending the data packet to a first data processing channel for processing at a first send time, sending the data packet to a second data processing channel for processing at a second send time,
receiving first processed data from the first data processing channel at a first return time,
receiving second processed data from the second data processing channel at a second return time,
determining percent accuracy for the first processed data,
determining percent accuracy for the second processed data,
determining a measure of security for each of the first data processing channel and the second data processing channel and record the measure of security in an analytics system, wherein determining the measure of security further comprises determining a firewall status, determining if processed data was modified, and determining data loss throughout transmission, and
recording the first send time, the second send time, the first return time, the second return time, the percent accuracy for the first processed data, and the percent accuracy for the second processed data in an analytics system.

14. The method for parallel testing of multiple data processing channels according to claim 13, wherein the method further comprises:
determining a measure of security for each of the first data processing channel and the second data processing channel, and
recording the measure of security in the analytics system.

15. The method for parallel testing of multiple data processing channels according to claim 13, wherein the first data processing channel and the second data processing channel are each selected from the group comprising a 4G network, a 5G network, a broadband network, and a dial-up network.

16. The method for parallel testing of multiple data processing channels according to claim 13, wherein the data packet comprises at least one of a resource amount, a cardholder name, a cardholder address, a card number, and a card expiration date.

17. The method for parallel testing of multiple data processing channels according to claim 13, wherein the data packet is encrypted.

* * * * *